United States Patent [19]

Hanson et al.

[11] 4,430,227
[45] Feb. 7, 1984

[54] METHOD OF CONCENTRATING AQUEOUS SOLUTIONS

[75] Inventors: Donald N. Hanson, Orinda; Scott Lynn, Walnut Creek, both of Calif.

[73] Assignee: The Regents of the University of California, Berkeley, Calif.

[21] Appl. No.: 178,870

[22] Filed: Aug. 18, 1980

[51] Int. Cl.³ .......................................... B01D 11/04
[52] U.S. Cl. .................................. 210/642; 423/157
[58] Field of Search ............... 210/634, 642; 423/179, 423/181, 208, 157; 23/306

[56] References Cited

U.S. PATENT DOCUMENTS

| | | | |
|---|---|---|---|
| 3,239,459 | 3/1966 | Patterson | 210/642 |
| 3,350,298 | 10/1967 | Carr | 210/642 |
| 3,823,000 | 7/1974 | Johnson | 210/642 |
| 4,078,978 | 3/1978 | Zirngiebl | 423/157 |
| 4,261,818 | 4/1981 | Sweeney | 210/642 |

Primary Examiner—Frank A. Spear, Jr.
Attorney, Agent, or Firm—Edward B. Gregg

[57] ABSTRACT

Method of concentrating aqueous solutions of non-volatile, ionic solutes by extracting water from the solution by means of a polar organic liquid (or a solution of a polar organic liquid and a non-polar organic liquid) at an elevated temperature and cooling the organic liquid to separate a water phase, the extractant and the temperatures being chosen such that water has a relatively high solubility in the extractant at the higher temperature and a relatively low solubility at the lower temperature; the extractant being also chosen to meet certain other criteria such as inertness toward the solution and equipment. Advantage is taken of the diminished activity coefficient of water in polar organic liquids at elevated temperatures and in the case of certain solutions, advantage is also taken of the increased activity coefficient of water in aqueous ionic solution at elevated temperatures.

10 Claims, 4 Drawing Figures

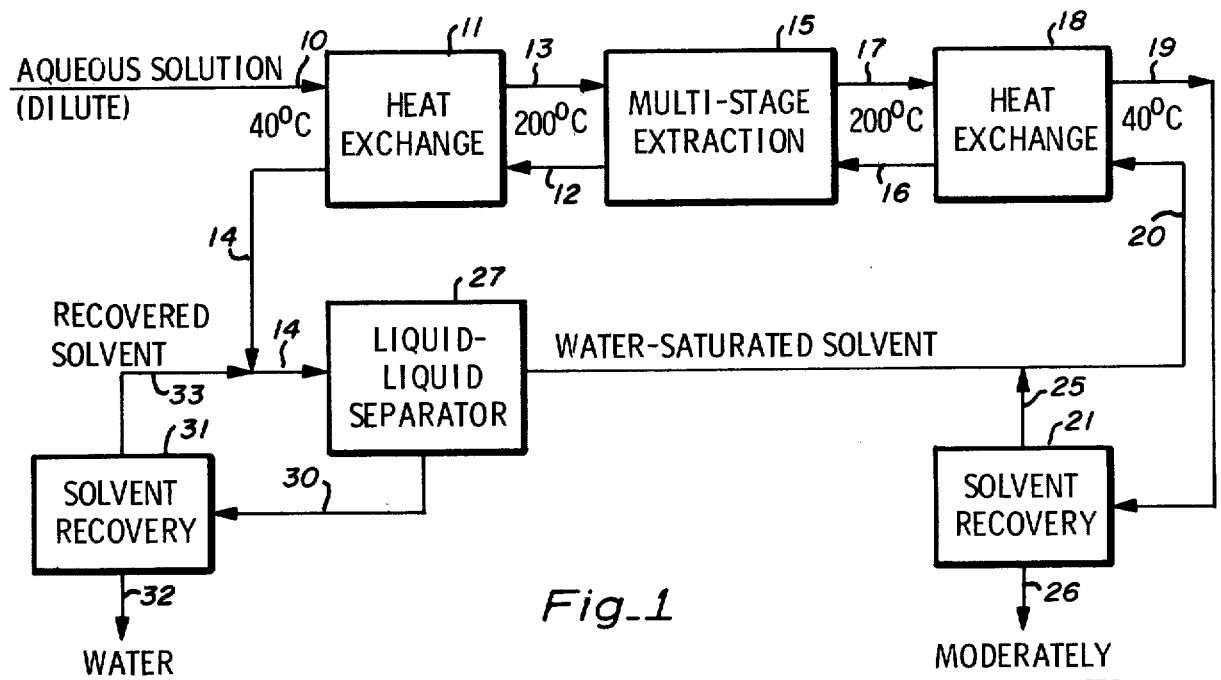
Fig_1
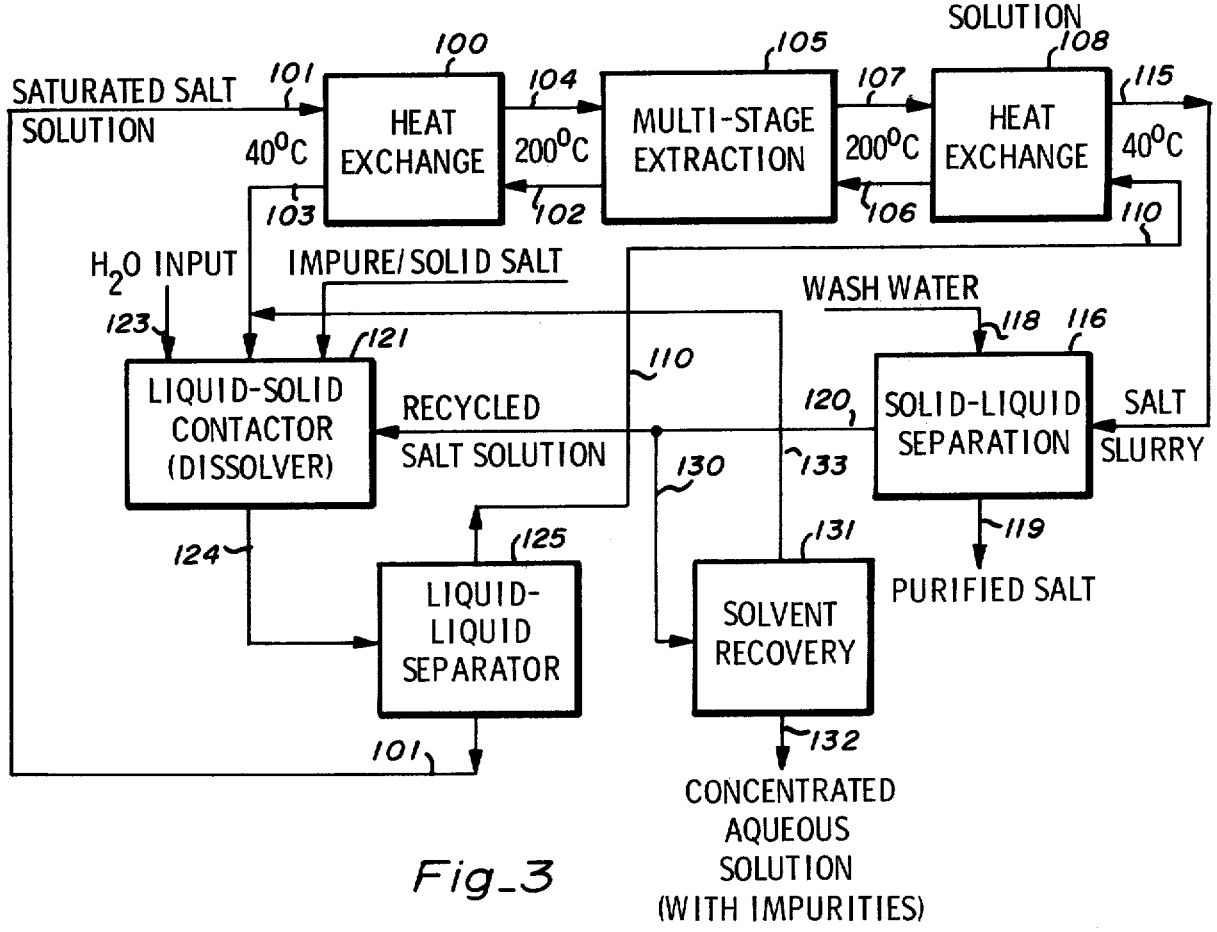
Fig_3

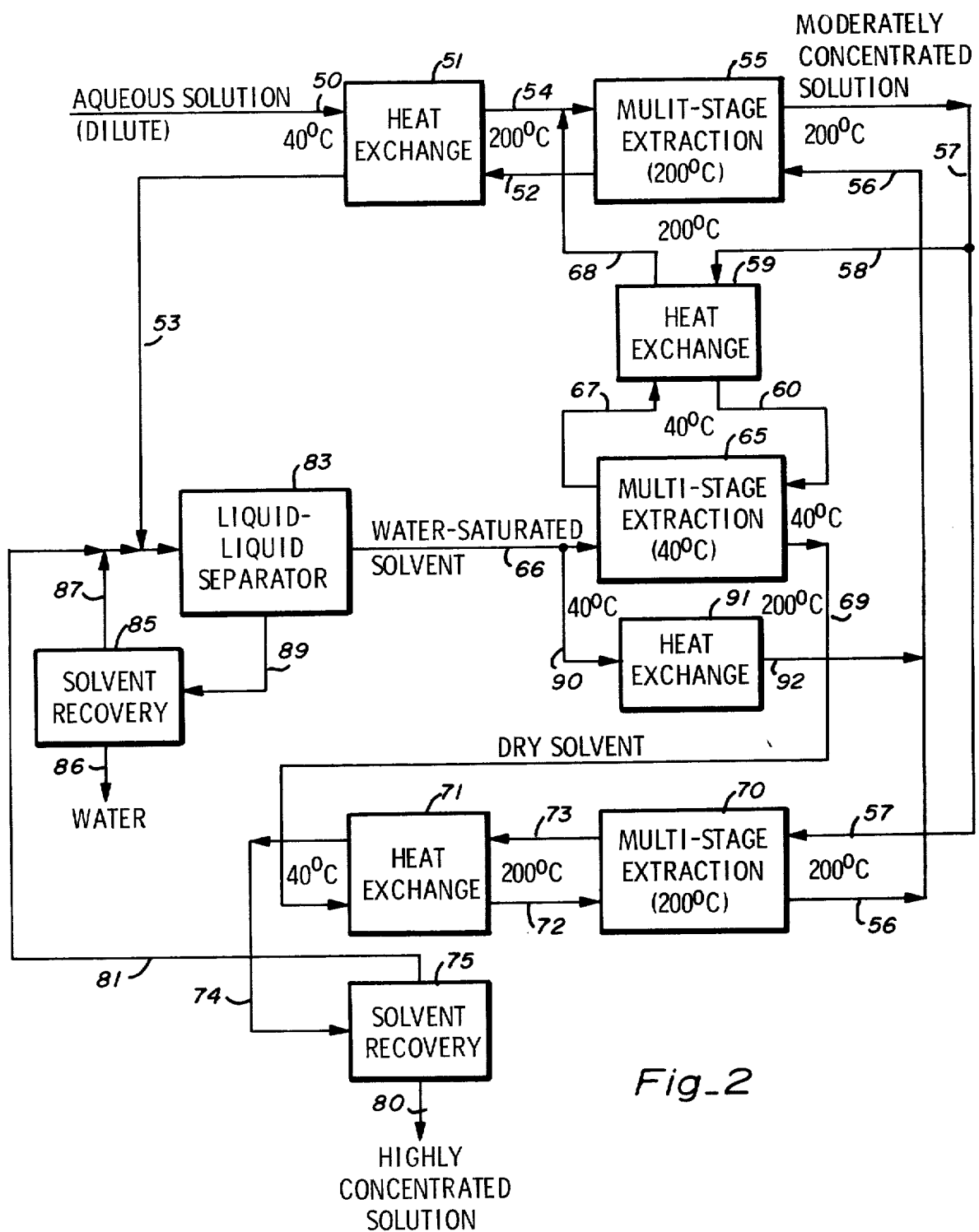
Fig_2

METHOD OF CONCENTRATING AQUEOUS SOLUTIONS

This invention relates to the use of polar organic liquids to extract water from aqueous solutions of non-volatile inorganic or organic ionic solutes and particularly from industrial solutions such as solutions of various inorganic compounds such as sodium hydroxide containing about 10 to 15% of NaOH produced by electrolysis of sodium chloride solutions and magnesium chloride solutions containing about 8% of $MgCl_2$ produced from sea water by ion exchange. In the process of the present invention, advantage is taken of the fact that certain polar organic liquids have a greater affinity for water, i.e., they are more hydrophilic, at moderately elevated temperatures than at lower temperatures. Such organic liquids can, therefore, be used at a moderately elevated temperature to extract water from and to concentrate certain aqueous solutions of non-volatile ionic solutes. By separating the organic and aqueous phases and reducing the temperature of the separated organic phase, water is separated and the dewatered organic phase can be recycled. The end products of the process are a separated aqueous phase which is more concentrated in the solute than the initial aqueous solution and a second aqueous phase that contains the separated water. The extraction process is advantageous relative to evaporation as a means of concentrating aqueous solutions because of the reduced energy requirement.

Advantage has been taken of this phenomenon, i.e., an increase of hydrophilicity as temperature is increased, to desalinate saline water by means of hydrocarbons. Thus Barton and Fenske in a paper entitled "Hydrocarbon Extraction of Saline Waters" published in *Industrial & Engineering Chemistry Process Design & Development*, Vol. 9, pages 18-25 (1970) propose the use of hydrocarbons at high temperature (650° F. or about 340° C.) and pressure (2,600 psia or about 177 atmosphere) for desalination. Liquids at or near their critical temperature and pressure have been proposed for use as selective solvents in a number of industrial processes. See, for example, *Chemical Engineering* of Mar. 12, 1979, pages 41 to 43.

Hydrocarbons, however, require high temperatures approaching the critical temperature of water (372° C.) and therefore high pressure to be effective for extracting water. Such conditions require heavy equipment to withstand the pressure. Moreover, certain substances, including water itself, which are not corrosive or only midly corrosive at lower temperatures, exhibit a corrosive action which is disadvantageous or unacceptable at such high temperatures.

It is an object of the present invention to provide improvements in the concentration of aqueous solutions of non-volatile ionic solutes without resort to evaporation.

It is further object of the invention to provide improvements in the concentration of such solutions by extraction of the water with an organic liquid.

It is a particular object of the invention to provide methods whereby an industrial solution of, for example, 5 to 20% concentration with respect to a non-volatile ionic solute may be efficiently concentrated (without the need to evaporate water) to, for example, a 20 to 50% concentration with respect to the solute, and to do so at moderately elevated temperatures and pressures.

The above and other objects of the invention will be apparent from the ensuing description and the appended claims.

In accordance with the present invention, aqueous solutions of non-volatile, ionic, inorganic or organic solutes are concentrated by extracting water by means of a suitably selected polar organic liquid at a suitable elevated temperature, and under pressure sufficient to maintain the aqueous and organic phases in the liquid state. A condition of equilibrium or near equilibrium is brought about between the aqueous phase and the organic phase, the organic phase is separated and its temperature is reduced to separate dissolved water so that the organic liquid can be recycled.

Provided the polar organic liquid is chosen according to properties described below, this procedure, i.e. the employment of a polar organic liquid as the extractant, offers significant advantages over non-polar organic liquids such as hydrocarbons. One of the advantages is that such liquids may be used effectively at more moderate temperatures, preferably below 300° C., and hence at more moderate pressures, not exceeding 100 atmospheres.

Apart from certain other properties of the system which are described below, the polar organic liquid will be chosen in accordance with the following criteria: At a given temperature, the partial pressure of water vapor in equilibrium with a solution containing water is given by the following equation:

$$P_{H_2O} = [\gamma_{H_2O}][X_{H_2O}]P_{H_2O}^o \quad (1)$$

where $P_{H_2O}$ is the partial pressure of water vapor over the solution, $P_{H_2O}^o$ is the vapor pressure of pure water, $\gamma_{H_2O}$ is the activity coefficient of water in the solution and $X_{H_2O}$ is the mol fraction of water in the solution.

From equation (1), for a two-phase system at equilibrium, one such phase being an aqueous phase with water as solvent and one or more non-volatile ionic inorganic or organic solutes, the other being an organic phase, the following equation can be derived:

$$[\gamma_{H_2O}^o][X_{H_2O}^o] = [\gamma_{H_2O}^a][X_{H_2O}^a] \quad (2)$$

where $\gamma_{H_2O}^o$ is the activity coefficient of water in the organic phase, $X_{H_2O}^o$ is the mol fraction of water in that phase $\gamma_{H_2O}^a$ is the activity coefficient of water in the aqueous phase and $X_{H_2O}^a$ is the mol fraction of water in that phase. The factor of interest is $X_{H_2O}^o$ which is as follows:

$$X_{H_2O}^o = \frac{[\gamma_{H_2O}^a][X_{H_2O}^a]}{\gamma_{H_2O}^o} \quad (3)$$

From Equation (3) it is apparent that at equilibrium the concentration of water in the organic phase increases as the activity coefficient of water in the aqueous phase increases (that is, there is a direct proportionality between these quantities) and also that the concentration of water in the organic phase increases as the activity coefficient of water in the organic phase decreases (i.e., these quantities are inversely proportional to one another). As will become apparent from the detailed description of the invention hereinbelow this offers a wide choice of organic solvents including some which are water-miscible at ambient temperature provided $\gamma_{H_2O}^o$ increases greatly with temperature within a practical range of temperatures and/or $\gamma_{H_2O}^o$ decreases greatly with temperature within a practical range of temperatures. This is illustrated below by the use of monoglyme to concentrate sodium hydroxide solution.

In its broad aspect, and apart from other considerations and parameters which are described below, our process of dewatering an aqueous solution may be described as follows: The aqueous solution is brought into contact with, and into a state of equilibrium or near equilibrium with a polar organic solvent at a temperature $T_1$, the solvent and the temperature $T_1$ being chosen so that there results an aqueous phase and an organic phase in which the organic phase contains a substantial mole fraction of water. The separated organic phase is then altered in temperature to a temperature $T_2$ less than $T_1$ at which much or substantially all of the water content separates as an aqueous phase. The separated organic phase can then be recycled.

A wide slection of polar organic solvents is available which meet the requirements stated above. However, the selection should be guided by other considerations including the following:

(1) The polar organic liquid must be stable at the highest temperature encountered during the process. (Also the solute must be stable at such temperatures.)

(2) The polar organic liquid must be unreactive or substantially unreactive with water and the solute or solutes at temperatures encountered during the process.

(3) The solute should have low solubility in, preferably being immiscible with the polar organic liquid at temperatures encountered during the process.

(4) Preferably the polar organic liquid is one which has a very low solubility in the aqueous phase at all temperatures encountered during the process. However, as described below with reference to monoglyme, a polar organic liquid which is miscible with water at ambient temperatures can be managed.

(5) The equipment must be compatible with the conditions of use, e.g. as regards corrosion and pressure.

It is also preferred that the organic solvent be volatile, e.g. that it have a boiling point of about 70° to 130° C., so that residual solvent in the aqueous phases (the concentrated aqueous solution and the aqueous phase resulting from cooling the organic phase to separate water) can be readily removed by stripping. Also, it is preferred that the organic solvent be non-toxic.

Preferably a polar organic liquid is chosen which meets these criteria and which has within practical ranges of temperatures of extraction practical values of $\gamma_{H_2O}^o$ and $\gamma_{H_2O}^a$, e.g. a range of about 10 to 1 for $\gamma_{H_2O}^o$ and one of about 0.1 to 1 for $\gamma_{H_2O}^a$.

Examples of solutes to which the process of the invention is applicable are inorganic ionic solutes such as sodium hydroxide, sodium chloride, magnesium chloride, calcium chloride, potassium chloride, sodium sulfate, trisodium phosphate, ferrous chloride, ammonium phosphate, ferrous phosphate, etc. and salts of organic acids such as sodium acetate, sodium benzoate, etc. Concentrations of these solutes in the aqueous phase to be treated may range from 1% or less to 50% or more.

Examples of suitable polar organic solvents are: Alcohols such as methanol, ethanol, propanol, butanols; also, cyclic alcohols such as cyclohexanol; ketones such as acetone, methyl ethyl ketone, methyl isobutyl ketone; ethers such as diethyl ether, dioxane, ethylene glycol dimethyl ether, and other ethers containing one or more oxygen atoms, two or more alkyl or alkylene groups and which may be either linear or cyclic; amines such as triethyl amine, n- and iso-, propyl amines, and other primary, secondary, and tertiary alkyl amines; also aromatic compounds such as anisole.

Solvents which are water-immiscible at ambient or room temperature, e.g. 20° C. to 40° C., which are volatile and therefore more readily separated from residual water by distillation, which are non-toxic or have acceptably low toxicity and which exhibit a substantial reduction of $\gamma_{H_2O}^o$ with rise in temperature, are preferred.

Polar organic liquids may be used which are mixtures of two or more molecular species, including mixtures of homologues and isomers and mixtures of different classes of organic liquids such as alcohols, ketones, ethers and/or amines.

Hydrophilicity of the solvent may be modified by, for example, introducing an alkyl group into a molecule which is otherwise too hydrophilic, or by mixing the hydrophilic polar organic liquid with a non-polar organic liquid such as an aliphatic or aromatic hydrocarbon or mixture of hydrocarbons which is miscible with the polar organic liquid. It will therefore be understood that the term "polar organic liquid" does not exclude the presence of a non-polar or less polar diluent used in an amount sufficient to impart the needed hydrophobicity at the lower temperature $T_2$.

It should also be noted that the principles of this invention apply to both partial and complete dewatering of aqueous solutions. In many cases it may be advantageous to produce a more concentrated aqueous solution from a less concentrated solution by extracting only part of the water from a dilute solution into a suitable polar organic solvent at elevated temperature. In other cases it may be preferable to cause substantially all of the dissolved inorganic solute to precipitate by adding a suitable polar organic solvent to its solution in water at elevated temperature. In still other cases, when two or more inorganic solutes are present in the aqueous solution, it may be desirable to cause one or more solutes to precipitate while forming a concentrated solution of the other solute or solutes.

FIG. 4 provides an example of a way in which this invention may be practiced, using a polar organic liquid, ethylene glycol dimethyl ether (monoglyme), which is not optimal because of its complete miscibility with water at room temperature. This drawback is overcome by a technique illustrated in FIG. 4 and described below. With a less hydrophilic polar organic liquid the process can be considerably simplified.

Certain embodiments of the invention are illustrated by way of example in FIGS. 1, 2, 3, and 4 which are diagrammatic flow sheets and in which:

FIG. 1 illustrates the use of a water-immiscible solvent to produce a moderately concentrated solution from a dilute solution.

FIG. 2 illustrates the use of a water-immiscible solvent to produce a more highly concentrated solution.

FIG. 3 illustrates the use of a water-miscible solvent to concentrate an aqueous solution and to purify a solid salt.

Figure 4:
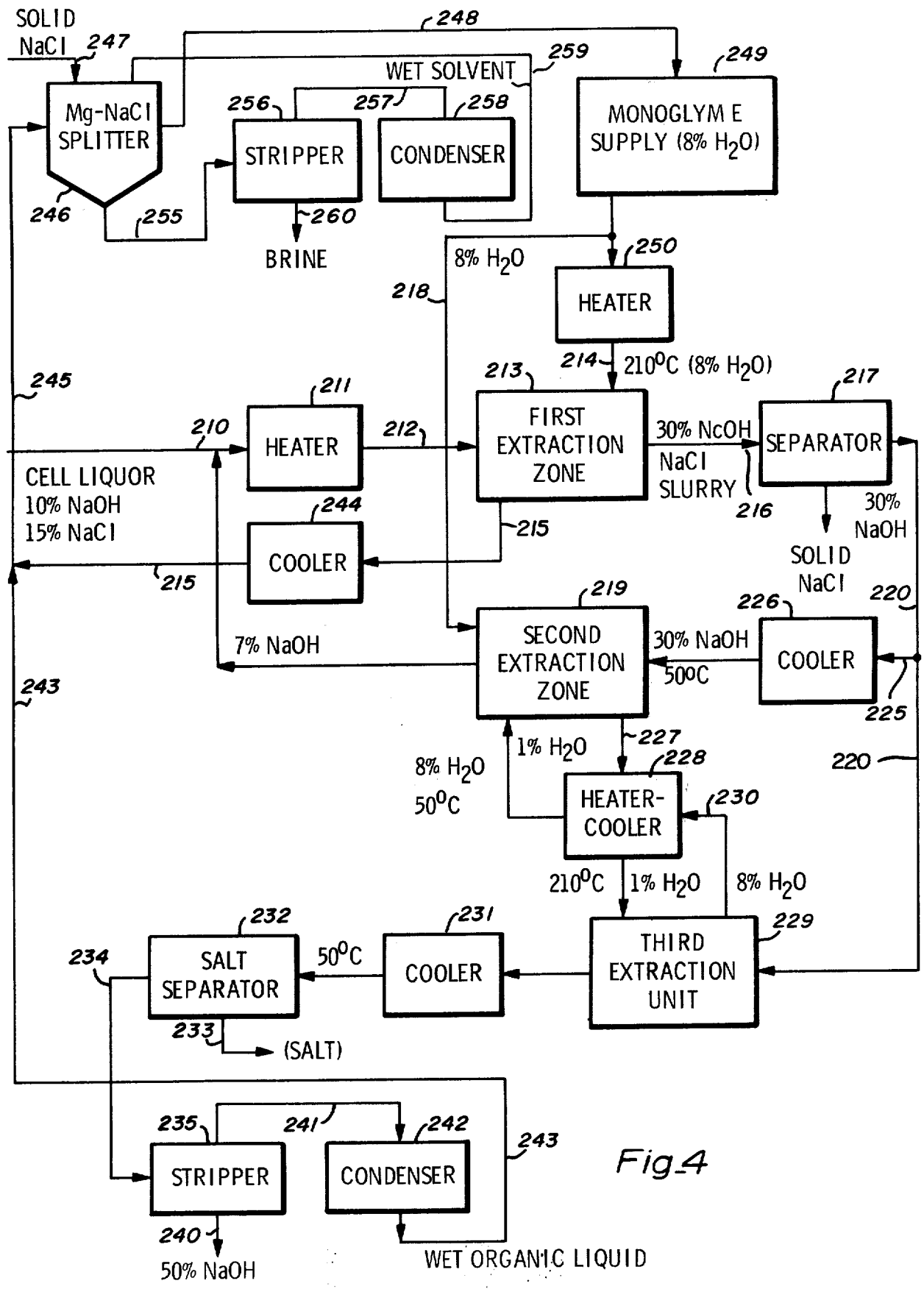
FIG. 4 illustrates the use of monoglyme (a water-miscible solvent) to concentrate a dilute solution of sodium hydroxide produced by electrolysis of sodium chloride solution.

Referring now to FIG. 1 an aqueous solution such as a 7% solution of magnesium chloride enters the system through line 10, passes through a heat exchanger 11 countercurrently to an incoming wet, water-immiscible solvent such as diethyl ether. Typically the solvent enters the heat exchanger at 200° C. and the solution at 40° C.

Throughout this and other figures where a temperature is indicated in connection with a heat exchanger it is to be understood that one fluid enters and the other leaves at approximately the same temperature. Thus aqueous solution enters heat exchanger 11 through line 10 at 40° C., solvent leaves through line 14 at 40° (all temperatures being centigrade), solvent enters at 200° through line 12 and solution leaves through line 13 at 200°. It will also be understood in this and other figures that there will be an input of heat into the system from an external source such as steam coils; also that, due to incomplete heat transfer, temperatures will not be identical.

The heated solution passes through line 13 into a multi-stage extraction unit 15. This and other like units are of known construction and cause intimate direct countercurrent contact of two liquid phases. Dry solvent is introduced into unit 15 at 200° through line 16. In this unit the solution is brought into direct contact with dry solvent at 200° at which temperature the solvent extracts water from the solution. The solvent enters through line 16 and the moderately concentrated solution leaves through line 17. The two streams pass counter currently through heat exchanger 18, the concentrated and cooled solution leaving through line 19 and dry solvent entering through line 20. The cooled (40°) solution passes into solvent recovery unit 21 where residual solvent is stripped by steam and is returned to the system through line 25 and 20. Moderately concentrated, e.g. 15% magnesium chloride, solution leaves at 26.

Solvent from heat exchanger 11 enters a liquid-liquid separator 27 through line 14. At the prevailing temperature (40°) water separates from the solvent by gravity. Dry solvent returns to heat exchanger 18 through line 20 and water leaves separator 27 through line 30 and enters solvent recovery unit 31 where residual solvent is stripped by steam. Water leaves the system through line 32 and dry solvent joins the solvent in line 14 by way of line 33.

Referring now to FIG. 2, dilute aqueous solution, for example a 7% solution of magnesium chloride, enters the system through line 50 and passes through heat exchanger 51 countercurrently to a stream of solvent, for example methyl ethyl ketone, which enters through line 52 and leaves through line 53. The aqueous solution, heated for example to 200°, leaves the heat exchanger through line 54 and enters a multi-stage extraction unit 55 where it is contacted with an incoming stream of moderately wet solvent entering through line 56. There is direct contact in unit 55 between the two phases at 200° C. The solvent extracts moisture from the solution and results in a moderately concentrated solution, e.g. 15%, which leaves through line 57.

A portion of the effluent stream of moderately concentrated solution is diverted through line 58 to be cooled in heat exchanger 59 and through line 60 to a multi-stage extraction unit 65 where it is brought into direct contact with wet solvent entering through line 66. The temperature prevailing in unit 65, typically 40°, is such that water is extracted from the solvent by the moderately concentrated solution, which leaves the unit through line 67 and is reheated by passing through heat exchanger 59 countercurrently to the stream of solution entering through line 58. The heated, somewhat diluted solution is recycled by way of line 68 and line 54 to unit 55. Dry solvent leaves unit 65 through line 69.

Moderately concentrated solution at an elevated temperature, typically 200°, enters multi-stage extraction unit 70 by way of line 57. Dry solvent leaves unit 65 through line 69, passes through heat exchanger 71 where it is heated to 200° and leaves the heat exchanger 71 through line 72 and enters the unit 70. In that unit at the prevailing temperature (200°) the dry solvent thus introduced extracts a further quantity of water from the solution, and results in moderately wet solvent which passes by way of line 56 to unit 55. The more highly concentrated solution, e.g. concentrated to 30%, leaves unit 70 through line 73 and passes through heat exchanger 71 countercurrently to the stream of dry solvent entering through line 69. The now more highly concentrated solution at 40° leaves heat exchanger 71 through line 74 and passes to solvent recovery unit 75 where solvent is stripped. Concentrated solution leaves the system through line 80. Solvent leaves unit 75 through line 81 and joins the wet solvent in line 53 and enters liquid-separator 83. Wet solvent separated in gravity separator 83 passes through line 66 to extraction unit 65. Water separated in separator 83 leaves through line 84 to solvent recovery unit 85 and is stripped of solvent. Water leaves the system through line 86 and solvent leaves the recovery unit 85 through line 87 and joins the stream of wet solvent passing through line 53 to separator 83.

A portion of the wet solvent is diverted from line 66 by way of line 90 to heat exchanger 91 which is supplied with heat from an external source and is raised in temperature from 40° to 200°. The heated wet solvent then passes through line 92 to line 56 and is recycled to extraction unit 55.

Referring now to FIG. 3 the purpose of this system is to purify an impure solid salt such as impure sodium chloride. A saturated solution of such a salt containing some or all of the impurities which were in the solid salt (such saturated solution being produced as described hereinafter) enters a heat exchanger 100 through line 101 and is heated from an initial temperature, typically 40°, to a higher temperature, typically 200°, by countercurrent heat exchange with a stream of wet solvent entering through line 102 and leaving through line 103. The heated salt solution leaves heat exchanger 100 through line 104 and enters multi-stage extraction unit 105 where it is brought into contact with a stream of wet solvent at an elevated temperature, typically 200° which enters through line 106 This concentrates the salt solution. The heated, concentrated, salt solution leaves through line 107 and passes through heat exchanger 108 countercurrently to a stream of wet solvent entering through line 110. This results in cooling the salt solution to for example 40°. The cooled solution passes by way of line 115 to solid-liquid separation unit 116. At the prevailing temperature (40°) the salt solution (which has been concentrated in unit 105 at 200°) will precipitate solid salt and will be in the form of a slurry. The slurry passes into separation unit 116. Wash water enters through line 118, purified solid salt leaves through line 119, and combined wash water and salt solution leave through line 120 and pass into liquid-solid contactor 121. Impure solid salt is introduced through line 122 and water through line 123. The solid salt is dissolved in unit 121 to produce a saturated salt solution at 40°. Wet solvent enters the same unit through line 103 and at the prevailing temperature (40°) the saturated salt solution extracts water from the wet solvent. The dry solvent and saturated salt solution leave through line 124 to liquid-liquid separator 125. Salt solution (brine) leaves through line 101 and is recycled to heat exchanger 100 while separated wet solvent leaves through line 110 to be recycled to heat exchanger 108.

A portion of the salt solution is diverted from line 120 through line 130 to a solvent recovery unit 131 which strips solvent from this solution. Concentrated aqueous solution containing impurities from the impure solid salt leaves the system through line 132 and solvent leaves through line 133 and is recycled by way of line 133.

Referring now to FIG. 4, cell liquor from the electrolysis of sodium chloride, typically containing about 10% NaOH and about 15% NaCl, enters the system through line 210 and is heated indirectly in heater 211 to, for example, 210° C. The heated aqueous stream, kept under pressure sufficient to prevent formation of a vapor phase, passes through line 212 into extraction unit 213 where it is contacted countercurrently with a stream of partially dried monoglyme entering through line 214 and leaving through line 215, such being at the process temperature at this point, e.g. 210° C., and under sufficient pressure to prevent the formation of a vapor phase. Partially dewatered solution containing, e.g. 30% NaOH, dissolved NaCl and solid NaCl (i.e. a slurry) leaves unit 213 by line 216. The wet monoglyme leaving through line 215 will contain, typically, about 24% water. Solid NaCl is separated in separator 217, e.g. by filtration or centrifugation. The separated NaCl may be washed free of NaOH by means of water and may be recycled to the electrolytic cells (not shown).

If it is desired to concentrate the 30% NaOH effluent from separator 217 to 50% NaOH (commercial-strength caustic solution), it may be accomplished as follows: At the process temperature of 210° C. monoglyme containing less than 3% water is in equilibrium with caustic solution containing 50% NaOH. Wetter monoglyme containing, e.g. 8% water, which is produced in the process as described below, is introduced through line 218 into a countercurrent extraction unit 219. 30% caustic leaves separator 217 through line 220 and part of it is diverted by line 225 to cooler 226, where it is cooled from the process temperature of 210° C. to, e.g., 50° C. and is caused to pass into extraction unit 219 countercurrently to wet (8% H$_2$O) monoglyme. This dries the monoglyme to, e.g., 1% H$_2$O. The diluted caustic solution may be recycled to join the aqueous solution of NaOH and NaCl entering heater 211, as shown in FIG. 4, or may be heated and re-extracted in a parallel extraction train, not shown. The dry monoglyme passes by line 227 through heater/cooler 228 and into a third extraction unit 229 at 210° C. In this unit the dry monoglyme extracts water from the 30% NaOH entering through line 220 and raises the caustic concentration to 50%. Wet, e.g. 8% H$_2$O content monoglyme passes by line 230 through heater/cooler 228 where it is cooled to 50° C. and returned to extraction unit 219.

The slurry of sodium chloride in 50% caustic solution leaves extraction unit 229, is cooled, e.g. to 50° C. in cooler 231 and passes into salt separator 232 where solid NaCl is separated and is processed as described above, after leaving through line 233. The aqueous phase (50% NaOH) passes by line 234 into stripper 235 where it is heated, e.g. by a steam coil, to strip it of monoglyme. Product (50% NaOH) leaves through line 240 and monoglyme vapor with attendant water vapor passes through line 241 to condenser 242, thence by line 243 for recycling and processing as described below.

The stream of wet monoglyme in line 243 is joined by wet monoglyme passing from the first extraction unit 213 by way of line 215 and through cooler 244 where it is cooled from the process temperature of 210° C. to 50° C. The combined streams pass by line 245 to monoglyme-water splitter 246. Solid NaCl or, alternatively, a concentrated aqeuous solution of NaCl, is introduced into splitter 246 at 247 resulting in a phase separation into an upper organic phase (monoglyme containing 8% H$_2$O) and a lower aqueous phase containing, e.g. 20% NaCl. The organic phase passes by line 248 to holding tank 249 where it is supplied as needed through lines 214 and 218 to the system. That which passes through line 214 is heated to the process temperature of 210° C. by heater 250.

The aqueous phase passes by line 255 to stripper 256 where it is contacted countercurrently by steam to strip monoglyme which leaves by line 257 to condenser 258. Wet liquid monoglyme is recycled to splitter 246 by line 259. NaCl solution (brine) leaves the system through line 260 and is recycled to the electrolytic cells.

The system described above with reference to the drawing makes practical the use of a polar organic extractant such as monoglyme that is less than optimum as regards water miscibility. By integrating it with a related process (electrolysis of sodium chloride solution to produce caustic and chlorine) it is made practical. By employing a less water-miscible polar organic liquid, e.g., ethylene glycol diethyl ether, the process can be simplified.

In FIG. 4 and in the description thereof a cell liquor is treated which contains a considerable amount of sodium chloride. There is, however, an electrolytic process which employs a cation-exchanger membrane to separate the cathode compartment from the anode compartment. Typically such a membrane is made of a fluorinated polymer resistant to both sodium hyroxide and chlorinated brine, and containing anionic groups such as sulfonates or carboxylates. Such a membrane acts as an ion-exchange medium which allows passage of sodium ions from the anode side to the cathode side but which repels chloride ions. Accordingly, the cell liquor from the cathode side contains sodium hydroxide but is free of sodium chloride. Also this cell liquor will contain a high concentration of sodium hydroxide, for example, 20%. The process shown in FIG. 4 and described above is applicable to such a liquor but does not require such units and steps as separation of solid sodium chloride in separator 217 and salt separation in separator 232.

A variant of FIG. 4 comprises the use of solvent which has a low solvating power for water at ambient temperature. An example of such a solvent is the di-ethyl homologue of monoglyme, i.e. the di-ethyl ether of ethylene glycol. This solvent, when in equilibrium with water at ambient temperature, e.g. 20° C., contains about 10% water. Such solvents may be described as "immiscible" with water at ambient temperature. As will be apparent from FIG. 4, monoglyme, although it is miscible with water in all proportions at ambient temperature, contains only about 8% water when in equilibrium with a saturated sodium chloride brine.

By using the di-ethyl ether of ethylene glycol the process of FIG. 4 may be used without adding sodium chloride to the phase splitter 246. Therefore, the supply of the di-ethyl ether of ethylene glycol in vessel 249 contains about 3.6% water. Otherwise the system of FIG. 4 is used as shown. As noted above if a cell liquor free of sodium chloride is treated, the sodium chloride separators are eliminated.

In FIGS. 1 to 4 and in the description of these figures certain streams have been shown passing through heat exchangers. For example, referring to FIG. 2, heat exchanger 51 is shown as causing heat exchange between hot (200° C.) solvent entering through line 52 and leaving through line 53 and an aqueous solution entering through line 50 and leaving through line 54. Thus hot liquids leave and enter the hot end of heat exchanger 51 at 200° C. and cold liquids enter and leave the cold end at 40° C. It will be seen that heat exchanger 71 functions similarly; that is, liquids enter and leave the hot end at 200° C. and leave and enter the cold end at 40° C. If convenience or other factors so indicate and since the heat exchange is similar in both heat exchangers 51 and 71, stream 73, 74 may pass through heat exchanger 51 and stream 52, 53 may pass through heat exchanger 71. This is given by way of example only. Heat exchange need not be limited to exchange between an aqueous stream and a solvent stream. The choice in any given instance will depend upon a number of factors such as proximity of units to one another by reason of the layout of the system, relative flow rates and heat capacities and other considerations well known to those skilled in the art.

It will therefore be apparent that novel and useful processes are provided for de-watering or concentrating aqueous solutions of non-volatile ionic solutes, purifying solid salts, etc.

We claim:

1. A method of concentrating an aqueous solution of a non-volatile ionic solute in stages from a low concentration to an intermediate higher concentration and then to a highest concentration, said method comprising:
   (a) providing first, second and third extraction zones for direct, intimate, countercurrent contact between such aqueous solution and a water immiscible, polar, organic solvent having low solubility for water at ambient temperatures and having an enhanced solubility for water at an elevated temperature, said polar organic solvent being stable and unreactive with the aqueous solution and solute and with the equipment employed and having low solvent power for the solute
   (b) causing continuous, intimate, countercurrent contact between such solution of lowest concentration and such solvent in the first contact zone and at an elevated temperature and continuously withdrawing from such zone a stream of wet solvent and a stream of solution of intermediate concentration,
   (c) cooling the effluent stream of wet solvent and a portion of the effluent stream of solution from the first zone,
   (d) separating water from the cooled stream of solvent,
   (e) causing continuous, intimate, counter-current contact in said second zone between the thus dewatered solvent and the thus cooled portion of solution, the contact being carried out at a temperature such that water is extracted from the solvent to provide a drier solvent and the solution is diluted,
   (f) continuously withdrawing the diluted solution and the drier solvent from the second zone,
   (g) heating the diluted solution so withdrawn and recycling it to the first zone,
   (h) reheating the drier solvent stream withdrawn from the second zone and causing continuous intimate, countercurrent contact thereof with the remainder of the solution withdrawn from the first zone, such contact being carried out in the third zone and resulting in the extraction of water from the solution and production of a solution of highest concentration and of solvent containing the water that is extracted,
   (i) continuously withdrawing from the third zone a stream of solution of highest concentration and a stream of solvent containing extracted water and,
   (j) recycling the solvent stream thus withdrawn from the third zone to the first zone.

2. The method of claim 1 wherein heat exchange is carried out between solution entering and solvent leaving the first zone to heat the solution and cool the solvent; heat exchange is also carried out between solution entering and solution leaving the second zone to cool the entering solution and heat the leaving solution; and heat exchange is also carried out between solution leaving and solvent entering the third zone to heat the solvent and cool the solution.

3. The method of claim 2 wherein the aqueous solution is a solution of magnesium chloride.

4. A continuous method of concentrating cell liquor from the electrolysis of aqueous sodium chloride, such cell liquor containing sodium hydroxide dissolved therein, said method comprising:
   (a) providing a supply of polar organic liquid containing dissolved therein a substantial amount of water but which, when brought into equilibrium at an elevated temperature with such cell liquor, results in an aqueous phase of enhanced sodium hydroxide concentration and an organic phase containing more water than the organic liquid in said supply, said organic liquid being stable and unreactive with the cell liquor and with the equipment employed and having low solvent power for sodium chloride and sodium hydroxide
   (b) providing first, second and third extraction zones
   (c) continuously and countercurrently contacting a first stream of organic liquid withdrawn from said supply with cell liquor in said first extraction zone at an elevated temperature,
   (d) continuously withdrawing from the first extraction zone a first stream and a second stream of sodium hydroxide solution enriched in NaOH and also continuously withdrawing from the first extraction zone a stream of wet organic liquid containing more water than said supply
   (e) continuously and countercurrently contacting the first such stream of sodium hydroxide solution in the second extraction zone with a second stream of organic liquid withdrawn from said supply, such contact being at a reduced temperature to provide a more dilute sodium hydroxide solution and a drier organic liquid,
   (f) continuously withdrawing more dilute sodium hydroxide solution and a drier organic liquid from the second extraction zone,
   (g) continuously and countercurrently contacting in the third extraction zone said second stream of sodium hydroxide with drier organic liquid withdrawn in step (f), such contact being carried out at an elevated temperature and results in an aqueous phase which is further enriched in sodium hydroxide and an organic phase which is wetter than the incoming stream of organic liquid, (h) continuously and separately withdrawing such phase from the third extraction zone, (i) cooling the organic phase so withdrawn and recycling it to the second extraction zone, (j) causing phase splitting of the organic liquid from step (d) at a reduced temperature to produce an aqueous phase and a drier organic phase containing a lesser water content than the organic liquid withdrawn in step (d)

and (k) recycling such drier organic phase to said supply of organic liquid.

5. The method of claim 4 wherein the cell liquor contains sodium chloride which is separated in solid form from the sodium hydroxide solution withdrawn in step (d).

6. The method of claim 4 wherein the cell liquor is substantially free of sodium chloride.

7. The method of claim 4 wherein the organic liquid is miscible or partially miscible with water at ambient temperature and the phase splitting in step (j) is carried out by adding solid sodium chloride or a concentrated aqueous solution thereof, to the organic liquid to form a brine with the water content of the organic liquid, such organic liquid being chosen so that at equilibrium with a brine solution it contains less water than the same organic liquid in equilibrium with water.

8. The method of claim 7 wherein the organic liquid is monoglyme.

9. The method of claim 4 wherein the organic liquid is chosen so that at ambient temperature it is in equilibrium with water and contains less water than the organic liquid withdrawn in step (d), and the phase splitting in step (j) is accomplished by reducing the temperature of the organic liquid.

10. The method of claim 9 wherein the organic liquid is the di-ethyl ether of ethylene glycol.

* * * * *